United States Patent [19]

Clopton

[11] Patent Number: 5,957,265
[45] Date of Patent: Sep. 28, 1999

[54] CONVEYOR WITH BRIDGE ROLLER ASSEMBLY

[75] Inventor: Robert T. Clopton, Magnolia, Ky.

[73] Assignee: Tekno, Inc., Cave City, Ky.

[21] Appl. No.: 08/874,932

[22] Filed: Jun. 13, 1997

[51] Int. Cl.[6] .......................... B65G 37/00; B65G 39/00; B65G 39/02

[52] U.S. Cl. .................. 198/600; 198/611; 198/635; 198/637; 193/35 R

[58] Field of Search .................................. 198/635, 600, 198/637, 611; 193/35 R

[56] References Cited

U.S. PATENT DOCUMENTS

| | | | |
|---|---|---|---|
| 1,772,584 | 4/1930 | Peiler | 198/611 |
| 1,881,184 | 10/1932 | Harris et al. | 193/35 R |
| 2,158,865 | 5/1939 | Sammon | 193/35 R |
| 2,182,202 | 12/1939 | Harris et al. | 193/35 R |
| 2,624,444 | 1/1953 | Casabana | |
| 3,853,212 | 12/1974 | Downes | |
| 5,215,182 | 6/1993 | Garbagnati | |
| 5,584,373 | 12/1996 | Layne | 198/600 |

FOREIGN PATENT DOCUMENTS 1239057  12/1984  U.S.S.R. .

*Primary Examiner*—Joseph E. Valenza
*Assistant Examiner*—Joe Dillon, Jr.
*Attorney, Agent, or Firm*—Wheat, Camoriano, Smith & Beres PLC

[57] ABSTRACT

A conveyor includes an assembly for bridging the gap at the end of a conveyor section. It includes an idler roller at the end of the conveyor section. The idler roller is seated in upwardly open slots and can lift completely out of the conveyor frame if an article becomes entrapped between the idler roller and the conveyor belt, in order to release the article.

4 Claims, 2 Drawing Sheets

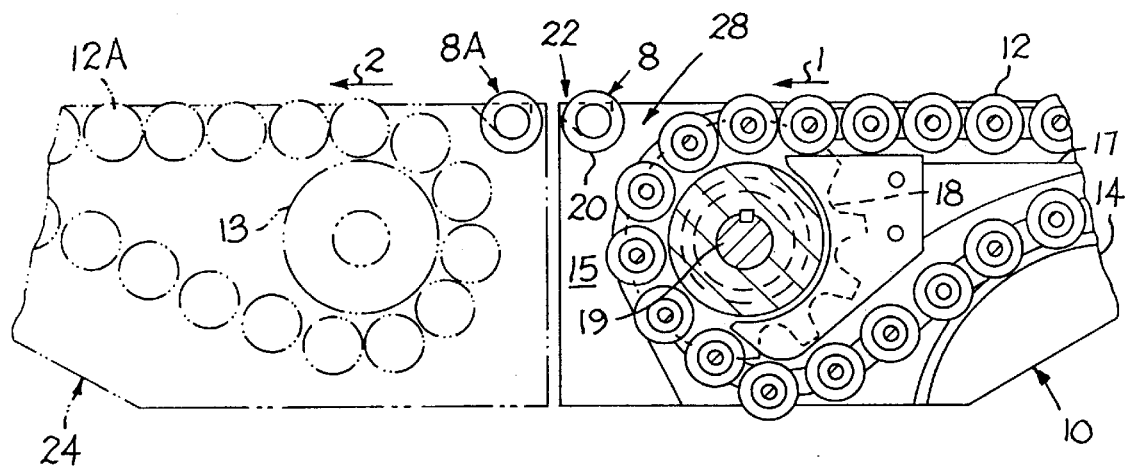
FIG. 2
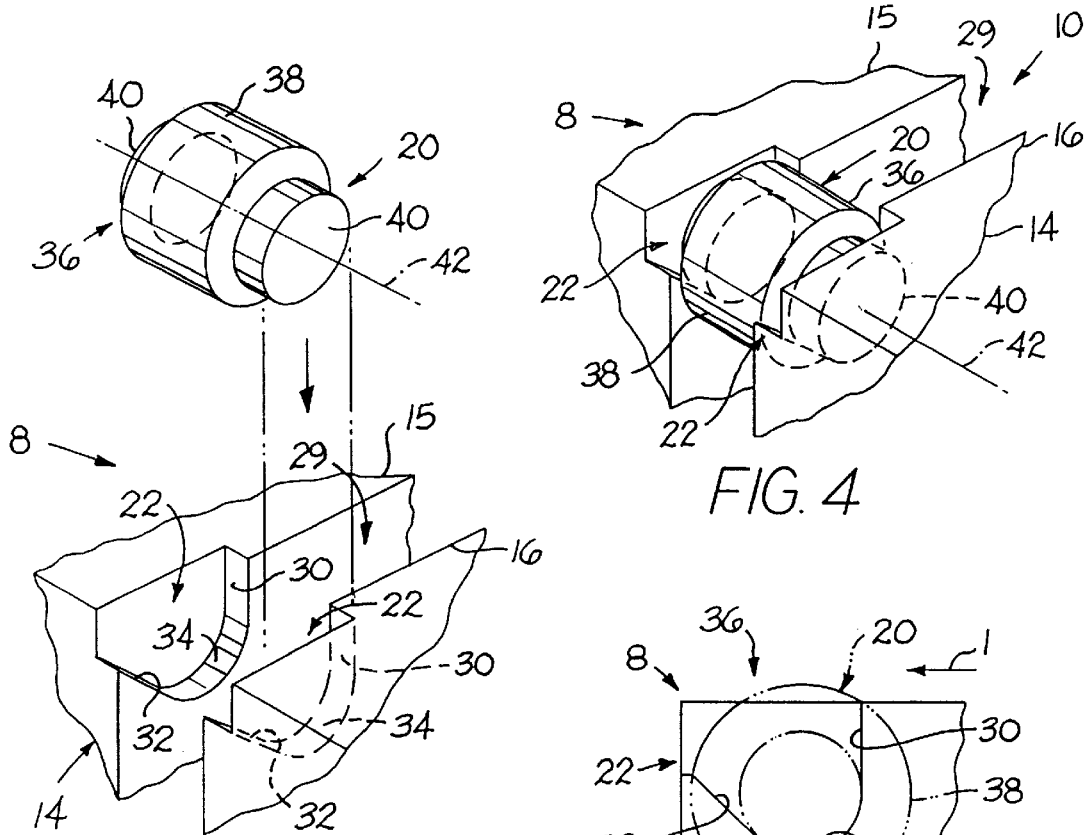
FIG. 3
FIG. 4
FIG. 5

CONVEYOR WITH BRIDGE ROLLER ASSEMBLY

BACKGROUND OF THE INVENTION

The present invention relates to conveyors, and, more particularly, to a conveyor including a device for bridging gaps in the conveyor.

In many conveyor systems, there are gaps at points along the conveyor. These gaps may be found at curves in the conveyor line, at the delivery end of the conveyor, or between sections of a continuous in-line conveyor. The main problem with these gaps is that shorter articles being carried on the conveyor may not be able to span the gap.

Prior art devices have been developed to aid in the transition of articles over such gaps in a conveyor system. These devices typically employ idler rollers or power-driven rollers to bridge the gap. However, such devices often create a serious hazard for an operator who may get his finger, hand, or clothing drawn between the gap-bridging roller and the conveyor.

SUMMARY OF THE INVENTION

It is an object of the present invention to provide a gap-bridging roller arrangement in a conveyor which will not trap articles between the conveyor belt and the bridging roller.

In a preferred embodiment of the present-invention, there is a frame member that includes a track for a conveyor belt. Between the end of the belt and the end of the frame member, there are two parallel walls that define a pair of tapered open slots, which receive the ends of an idler roller. Since these slots are tapered and open, the roller will naturally lift completely out of the frame if anything is caught behind it, thereby freeing whatever was caught.

BRIEF DESCRIPTION OF THE DRAWINGS

FIG. 2 is a side sectional view taken along line 2—2 of FIG. 1;

FIG. 3 is an enlarged, exploded perspective view of the idler roller and slot of the preferred embodiment of FIG. 1;

FIG. 4 is a perspective view of the idler roller and slot of FIG. 3, wherein the roller is seated in the slot; and FIG. 5 is a side view of the idler roller and slot of FIG. 4.

DESCRIPTION OF THE PREFERRED EMBODIMENT

Figure 1:
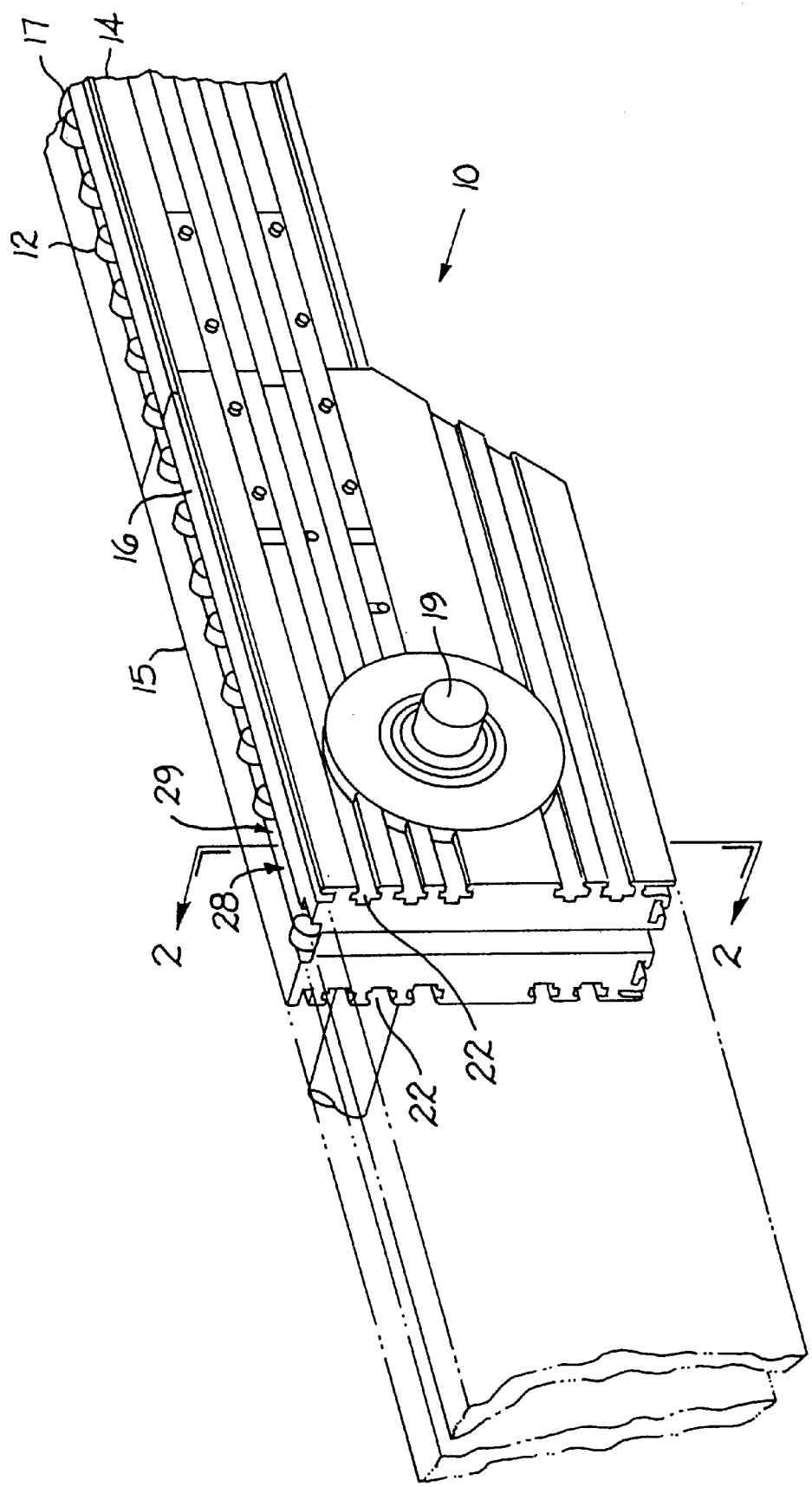
FIG. 1 is a broken-away perspective view of a frame member in a roller chain conveyor system, showing a preferred embodiment of the present invention.

FIG. 1 is a broken-away perspective view of a preferred embodiment of the present invention, wherein a bridge roller assembly 8 is installed on a conveyor 10 utilizing a belt 12 for carrying articles. In this preferred embodiment, the belt 12 is a roller chain, but other known belts could also be used. The conveyor 10 has a frame 14 that includes a track 17 in which the belt 12 travels. The roller chain 12 is driven by a drive sprocket 18 (shown in FIG. 2). Although not shown in the Figures, there often would be a second parallel frame so that articles would be carried by two parallel belts 12 on two parallel frames 14, usually driven by the same drive motor (not shown). The drive sprocket 18 would be connected to a second parallel drive sprocket on the second frame by the drive shaft 19. Also, at the other end of each frame 14, there is an idler sprocket or guide wheel 13 around which the loop of the chain 12 passes before returning to the drive sprocket 18.

The bridge roller assembly 8 includes an idler roller 20 that is seated in open slots 22 defined by two opposing, parallel side walls 15,16 of the frame 14. As shown in FIG. 2, these open slots 22 are located between the end of the belt 12 and the end of the frame 14. FIG. 2 also shows, in phantom, a second conveyor 24 having a bridge roller assembly 8A. Articles are carried by the first conveyor 10 along the path indicated by the arrow 1. As the articles reach the end of the first conveyor 10, they are transferred over the bridge roller assemblies 8,8A to the second conveyor 24 and continue to travel in the direction indicated by the arrow 2. The bridge roller assemblies 8,8A facilitate this transfer, supporting articles as they pass from the first roller chain 12 to the second roller chain 12A; however, there still is a small break between the roller chain 12 and the bridge roller assembly 8 as indicated generally by the numeral 28, and there is also a small break between the two bridge roller assemblies 8,8A.

While FIG. 2 shows a second conveyor abutting the conveyor 10, there may alternatively be a chute, a transfer station, or many other elements beyond the conveyor 10, and the bridge roller assembly 8 would help the articles carried on the conveyor 10 get onto that chute or other element.

FIGS. 3–5 show the preferred bridge roller assembly 8 in more detail. A gap 29 is defined by the two opposing, parallel walls 15,16 of the frame 14. This gap 29 provides a space into which the bridge roller 20 fits, with the outer surface of the large diameter portion of the bridge roller 20 projecting through the gap 29 to support articles travelling along the conveyor. In this embodiment, the rollers of the roller chain also project through this gap 29 to carry the articles along the conveyor frame. Each of the walls 15,16 also defines an open slot 22 for receiving the ends 40 of the bridge roller 20. Each open slot 22 preferably has a first, substantially vertical leading surface 30 and a second, trailing surface 32 that is sloped, preferably at 45 degrees from the vertical. The leading surface 30 and the trailing surface 32 are connected by a curved surface 34, having a diameter approximately equal to the diameter of the reduced ends 40 of the idler roller 20. The trailing surfaces 32 are inclined upwardly and in the direction of travel of the belt 12, which feeds articles onto the bridge roller assembly 8, as best shown in FIG. 5. Likewise, the trailing surfaces 32 of the slots 22 of the second conveyor 24 also are inclined upwardly in the direction of travel of the belt 12A. It would also be possible to have the leading surfaces 30 sloped upwardly at an angle opposite to the angle of the trailing surfaces 32, so that, if the belt 12 reversed its direction of travel, the leading surfaces 30 could function as trailing surfaces.

FIG. 3 shows that the idler roller 20 itself is a cylindrical body 36 having a large-diameter central portion 38 and two reduced-diameter end portions 40, and-defining an axis of rotation 42. The reduced-diameter end portions 40 rest on the curved bottom surfaces 34 of the open slots 22, thereby seating the idler roller 20 in the slots 22. The large-diameter central portion 38 of the idler roller 20 projects through the gap 29 defined by the walls 15,16.

As shown in FIG. 4, the idler roller 20 thus is free to rotate about its axis 42 while it rests in the open slots 22 of the frame 14, supporting articles that are travelling off the end of the conveyor 10. If something becomes lodged between the idler roller 20 and the belt 12, the roller 20 will move forward and upwardly along the sloping trailing walls 32, lifting completely out of the frame 14, and releasing whatever was caught.

It will be obvious to those skilled in the art that modifications may be made to the embodiment described above without departing from the scope of the present invention.

What is claimed is:

1. A conveyor, comprising:

an elongated conveyor frame having an end;

a belt mounted on said frame, said belt being operable to convey articles in a first direction;

a pair of upwardly open slots defined by said frame between said belt and said end of the frame; and an idler roller having first and second ends, each of said ends being seated in one of said upwardly open slots;

wherein each of said slots is defined by a leading surface, a bottom surface, and a trailing surface, wherein said trailing surface is sloped upwardly and in said first direction of travel so that, if an article were to get caught between said belt and said idler roller, the article would push said idler roller against said trailing surface, and said idler roller would travel up said trailing surface in the direction of travel of the belt and would lift completely out of the frame, thereby freeing whatever was caught.

2. A conveyor, comprising:

an elongated conveyor frame having an end, and having left and right parallel side walls;

a belt mounted on said frame, said belt being operable to convey articles in a first direction;

a pair of upwardly open slots defined by said left and right parallel side walls between said belt and said end of the frame; and an idler roller seated in said pair of upwardly open slots;

wherein said left and right parallel side walls defining said slots include a leading surface and a trailing surface, said trailing surface sloping upwardly and in said first direction, and said leading surface being substantially vertical.

3. A conveyor as recited in claim 2, wherein said idler roller is a cylindrical body having a large-diameter central portion and a pair of reduced-diameter end portions.

4. A conveyor as recited in claim 3, wherein a gap is defined by said parallel side walls, so that, when said reduced-diameter end portions of said idler roller are seated in said slots, said large-diameter portion projects through said gap.

* * * * *